R. LUCAS.
INTERNAL COMBUSTION ENGINE.
APPLICATION FILED MAY 21, 1909.
941,376.
Patented Nov. 30, 1909.
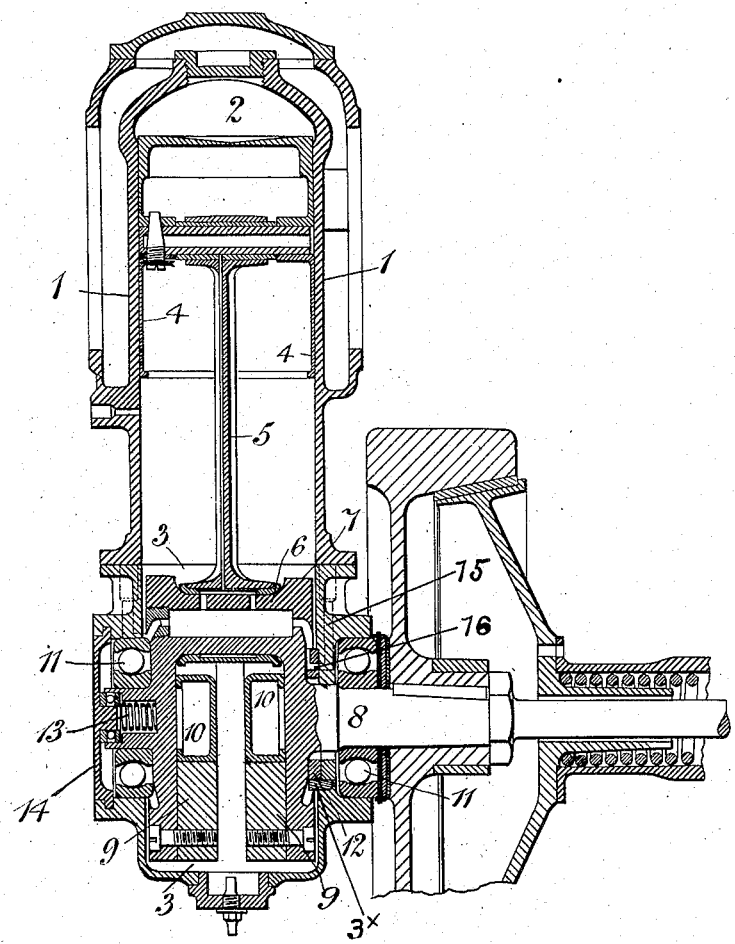

UNITED STATES PATENT OFFICE.

RALPH LUCAS, OF BLACKHEATH, ENGLAND, ASSIGNOR TO VALVELESS LIMITED, OF LONDON, ENGLAND.

INTERNAL-COMBUSTION ENGINE.

941,376.	Specification of Letters Patent.	Patented Nov. 30, 1909.

Application filed May 21, 1909. Serial No. 497,538.

*To all whom it may concern:*

Be it known that I, RALPH LUCAS, engineer, a subject of the King of Great Britain, residing at 191 Westcombe Hill, Blackheath, in the county of Kent, England, have invented new and useful Improvements in Internal - Combustion Engines, of which the following is a specification.

This invention relates to engines of the well known type having a closed crank chamber forming a reservoir for compressed air and the object of the invention is to prevent leakage of air from the crank chamber through the bearings of the crank shaft.

The drawing is a section of an engine constructed according to this invention.

1 is the cylinder, 2 the combustion chamber and 3 the crank chamber.

4 is the piston connected by the rod 5 to a crank pin 6 fixed to disk 7 on the crank shaft 8.

9 are counterbalance weights fixed to the disks 7 and 10 are filling pieces to diminish the volume of the air space in the crank chamber. The above is a well known arrangement and requires no further description.

According to this invention airtight joints are made where the crank shaft 8 enters the crank chamber 3 in the manner shown.

11 are ball bearings in which the shaft runs.

12 is a bearing ring let into the wall of the chamber 3 being ground into place and secured by a dowel pin $3^x$. The disk 7 fixed to the crank shaft is pressed against this ring by a spring 13 thus making a tight joint on one side, that on the other side being made by a cap 14 fixed in the wall of the crank-chamber by a bayonet joint.

15 is a pipe (connected to a hole 16 in the ring 12) through which lubricant is forced.

What I claim is:—

1. In an engine having a closed crank chamber the combination of the chamber, a crank shaft entering the chamber, a disk fixed to the crank shaft, a bearing ring surrounding the crank shaft and fixed to the wall of the chamber and a spring tending to force the crank shaft endwise and press the disk upon it against the bearing ring.

2. In an engine having a closed crank chamber the combination of the chamber, a crank shaft entering the chamber, a disk fixed to the crank shaft, a bearing ring surrounding the crank shaft and fixed to the wall of the chamber, a spring tending to force the crank shaft endwise and press the disk upon it against the bearing ring, an opening into the crank chamber at the end of the crank shaft and a cap closing the opening and forming an abutment for the spring.

RALPH LUCAS.

Witnesses:
FREDERICK I. BRIGHT,
CYRIL CHAPPELL.